(12) United States Patent
Forrest (10) Patent No.: US 11,128,628 B2
(45) Date of Patent: Sep. 21, 2021

(54) SYSTEM FOR AUTHORISING DATA ACCESS

(71) Applicant: Barclays Execution Services Limited, London (GB)

(72) Inventor: Michael Forrest, Knutsford (GB)

(73) Assignee: Barclays Execution Services Limited, London (GB)

( * ) Notice: Subject to any disclaimer, the term of this patent is extended or adjusted under 35 U.S.C. 154(b) by 302 days.

(21) Appl. No.: 16/268,983

(22) Filed: Feb. 6, 2019

(65) Prior Publication Data

US 2019/0245860 A1    Aug. 8, 2019

(30) Foreign Application Priority Data

Feb. 6, 2018  (EP) ..................................... 18155399

(51) Int. Cl.
*H04L 29/06* (2006.01)
*G06F 21/62* (2013.01)
*H04W 12/08* (2021.01)

(52) U.S. Cl.
CPC ............ *H04L 63/101* (2013.01); *G06F 21/62* (2013.01); *G06F 21/6263* (2013.01); *H04W 12/08* (2013.01); *G06F 2221/2141* (2013.01)

(58) Field of Classification Search
CPC ... H04L 63/10; H04L 63/101; H04L 63/1012; H04L 63/0876; G06F 21/62; G06F 21/6263; G06F 2221/2141; H04W 12/08; H04W 12/06
See application file for complete search history.

(56) References Cited

U.S. PATENT DOCUMENTS

| | | | |
|---|---|---|---|
| 9,389,993 B1* | 7/2016 | Okmyanskiy | ........... H04L 63/00 |
| 9,641,517 B1* | 5/2017 | Page | ..................... H04L 63/083 |
| 9,882,892 B1* | 1/2018 | Vogel | .................... H04L 63/102 |
| 2019/0130440 A1* | 5/2019 | Qiu | .................... G06Q 30/0248 |

FOREIGN PATENT DOCUMENTS

WO    WO 2017/209966 A1    12/2017

OTHER PUBLICATIONS

International Search Report and Written Opinion dated Feb. 27, 2019 in connection with International Application No. PCT/EP2019/052910.
Extended European Search Report dated Jul. 4, 2018 in connection with European Application No. 18155399.1.

* cited by examiner

*Primary Examiner* — Yogesh Paliwal
(74) *Attorney, Agent, or Firm* — Wilmer Cutler Pickering Hale and Dorr LLP

(57) ABSTRACT

A computer-implemented method for sharing user data associated with a first user. The method comprises receiving, from a second system, a first access message associated with a request for access to the user data stored at a first system. The first access message comprises a second system label indicative of an identifier of the second system. In response to receiving the first access message, the second system label is compared with a plurality of authorised entity labels and a plurality of unauthorised entity labels. In response to identifying that the second system label matches an authorised entity label and that the second system label does not match an unauthorised entity label, a grant message is transmitted indicative that the request for access is granted.

12 Claims, 6 Drawing Sheets

SYSTEM FOR AUTHORISING DATA ACCESS

RELATED APPLICATIONS

Foreign priority benefits are claimed under 35 U.S.C. § 119 to European application number 18155399.1, filed Feb. 6, 2018, the entire contents of which is hereby incorporated herein by reference in its entirety.

TECHNICAL FIELD

This disclosure relates to a system, a method and a computer program for authorising access to secure user data.

BACKGROUND

In digital communications systems data can be transferred between devices at high speeds and in large volumes. This is advantageous for distributing information widely, but comes with the drawback of the possibility of sensitive data being distributed to malicious or fraudulent entities that may compromise a user's security. Hence, it is of utmost importance for digital communications systems to be designed to allow sensitive data to be shared in a strictly controlled manner, in order to prevent any such malicious or fraudulent entities from accessing a user's private data.

SUMMARY

In one aspect of the invention there is a computer-implemented method for sharing data associated with a first user, the method comprising: storing, at a first system, user data associated with the first user; storing, at the first system, an authorised entity database comprising a plurality of authorised entity labels each indicative of an identifier of an authorised entity; storing, at the first system, an unauthorised entity database comprising a plurality of unauthorised entity labels each indicative of an identifier of an unauthorised entity; receiving a first access message, from a second system, associated with a request for access to the user data stored at the first system, the first access message comprising a second system label indicative of an identifier of the second system; in response to receiving the first access message, comparing the second system label with the plurality of authorised entity labels and the plurality of unauthorised entity labels stored at the first system; in response to identifying that the second system label matches an authorised entity label and that the second system label does not match an unauthorised entity label, transmitting a grant message indicative that the request for access is granted; and preventing transmission of the grant message, if the second system label in the first access message matches an unauthorised entity label and/or does not match an authorised entity label.

In this way, the method allows the identity of the second system to be checked against both the authorised entity database and the unauthorised entity database, such that the first system is able to determine whether the second system is an authorised entity. The unauthorised entity database can be used to override any decision made on the basis of the authorised entity database. This allows the unauthorised entity database to correct any errors that may be present in the authorised entity database. For instance, the authorised entity database may be out of date and may incorrectly indicate that a particular entity is authorised. In this situation, the unauthorised entity database can be referenced to ensure that secure user data is not sent to the entity that is not in fact an authorised entity.

In another aspect of the invention, there is a computer-implemented method for sharing data associated with a first user, the method comprising: storing, at a first system, user data associated with the first user; transmitting, from the first system to an authorisation system, a request to access an authorised entity database stored at the authorisation system, wherein the authorised entity database comprises a plurality of authorised entity labels each indicative of an identifier of an authorised entity; receiving and storing, at the first system, at least a portion of the authorised entity database; receiving an access message, from a second system, associated with a request for access to the data stored at the first system, the access message comprising a second system label indicative of an identifier of the second system; in response to receiving the access message, comparing the second system label with the plurality of authorised entity labels stored at the first system; identifying a match between the second system label and at least one of the plurality of authorised entity labels stored at the first system and, in response, transmitting a grant message indicative that the request for access is granted.

In this way, the first system is able to check a local copy of the authorised entity database instead of consulting the authorisation system. Checking the authorisation system in every instance where it is required may impose a burden on the processing resources. Thus, storing a local copy of the database assists in alleviating this burden. The authorisation system may service other similar systems that require access to the authorised entity database, and in this situation the authorisation system may create a so-called "bottleneck" or single point of failure for the system. The first system is able to detect authorised entities more reliably and quickly by storing a copy of the database at the first system itself. This will enhance the ability of the first system to ensure the security of the user's data.

In another aspect of the invention, there is provided a computer-implemented method for sharing data associated with a first user, the method comprising: storing, at a first system, user data associated with the first user; storing, at the first system, an authorised entity database comprising a plurality of authorised entity labels each indicative of an identifier of an authorised entity; receiving a first access message, from a second system, associated with a request for access to the user data stored at the first system, the first access message comprising a second system label indicative of an identifier of the second system; in response to receiving the first access message, comparing the second system label with the plurality of authorised entity labels stored at the first system and identifying a match between the second system label and at least one of the plurality of authorised entity labels stored at the first system and, in response, transmitting a grant message indicative that the request for access is granted; receiving a second access message, from the second system, associated with the request for access to the user data stored at the first system, the second access message comprising the second system label; in response to receiving the second access message, comparing the second system label with the plurality of authorised entity labels stored at the first system and identifying a match between the second system label and at least one of the plurality of authorised entity labels stored at the first system and, in response, transmitting a grant message indicative that the request for access is granted.

In this way, it is possible for the first system to determine whether the second system is authorised to receive secure user data in at least two instances before the data is transmitted. There may be a lag time between the first request from the second system to access the data and the second request. In this time, it is possible that the second system may transition from being authorised to receive user data to being unauthorised. For instance, the second system may be subject to a security breach in this time. Since the second system's status is checked initially and at a second time before data is transferred, it is possible to avoid transmitting the data to an unauthorised entity.

In another aspect of the invention, there is a data management system for sharing data associated with a first user, the data management system comprising: a data storage resource configured to: store user data associated with the first user; store an authorised entity database comprising a plurality of authorised entity labels each indicative of an identifier of an authorised entity; and store an unauthorised entity database comprising a plurality of unauthorised entity labels each indicative of an identifier of an unauthorised entity; and wherein the data management system further comprises processing circuitry configured to: receive a first access message, from a remote system, associated with a request for access to the user data stored at the first system, the first access message comprising a remote system label indicative of an identifier of the remote system; compare the remote system label with the plurality of authorised entity labels and the plurality of unauthorised entity labels stored at the first system, in response to receiving the first access message; transmit a grant message indicative that the request for access is granted, in response to identifying that the remote system label matches an authorised entity label and that the remote system label does not match an unauthorised entity label; and prevent transmission of the grant message, if the remote system label in the first access message matches an unauthorised entity label and/or does not match an authorised entity label.

In another aspect of the invention, there is a data management system for sharing data associated with a first user, the data management system comprising: a data storage resource configured to: store user data associated with the first user; store an authorised entity database comprising a plurality of authorised entity labels each indicative of an identifier of an authorised entity; and store an unauthorised entity database comprising a plurality of unauthorised entity labels each indicative of an identifier of an unauthorised entity; a receiver arranged to receive a first access message, from an remote system, associated with a request for access to the user data stored at the first system, the first access message comprising a remote system label indicative of an identifier of the remote system; a comparison module arranged to compare the remote system label with the plurality of authorised entity labels and the plurality of unauthorised entity labels stored at the data storage resource in response to receiving the first access message; and a transmitter arranged to transmit a grant message indicative that the request for access is granted in response to identifying that the remote system label matches an authorised entity label and that the remote system label does not match an unauthorised entity label; and wherein the transmitter is arranged to prevent transmission of the grant message, if the remote system label in the first access message matches an unauthorised entity label and/or does not match an authorised entity label.

In another aspect of the invention, there is a data management system for sharing data associated with a first user, the data management system comprising: a data storage resource configured to: store user data associated with the first user; wherein the data management system further comprises processing circuitry configured to: transmit, from the data management system to an authorisation system, a request to access an authorised entity database stored at the authorisation system, wherein the authorised entity database comprises a plurality of authorised entity labels each indicative of an identifier of an authorised entity; receiving and storing, at the data management system, at least a portion of the authorised entity database; receiving an access message, from a remote system, associated with a request for access to the data stored at the data management system, the access message comprising a remote system label indicative of an identifier of the remote system; in response to receiving the access message, comparing the remote system label with the plurality of authorised entity labels stored at the data management system; identifying a match between the remote system label and at least one of the plurality of authorised entity labels stored at the data management system and, in response, transmitting a grant message indicative that the request for access is granted.

In another aspect of the invention, there is a data management system for sharing data associated with a first user, the data management system comprising: a data storage resource configured to store user data associated with the first user; a transmitter arranged to transmit, from the data management system to an authorisation system, a request to access an authorised entity database stored at the authorisation system, wherein the authorised entity database comprises a plurality of authorised entity labels each indicative of an identifier of an authorised entity; a receiver arranged to receive at least a portion of the authorised entity database, wherein the data storage resource is arranged to store the at a portion of the authorised entity database; wherein the receiver is arranged to receive an access message, from a remote system, associated with a request for access to the data stored at the data management system, the access message comprising a remote system label indicative of an identifier of the remote system; a comparison module arranged to compare the remote system label with the plurality of authorised entity labels stored at the data management system, in response to receiving the access message; and an identification module arranged to identify a match between the remote system label and at least one of the plurality of authorised entity labels stored at the data management system and, in response, cause the transmitter to transmit a grant message indicative that the request for access is granted.

In another aspect of the invention, there is a data management system for sharing data associated with a first user, the data management system comprising: a data storage resource configured to: store user data associated with the first user; store an authorised entity database comprising a plurality of authorised entity labels each indicative of an identifier of an authorised entity; wherein the data management system further comprises processing circuitry configured to: receive a first access message, from a remote system, associated with a request for access to the user data, the first access message comprising a remote system label indicative of an identifier of the remote system; compare the remote system label with the plurality of authorised entity labels, in response to receiving the first access message, and identify a match between the second system label and at least one of the plurality of authorised entity labels and, in response, transmit a grant message indicative that the request for access is granted; receive a second access message, from the remote system, associated with the request for access to the user data, the second access message comprising the remote system label; compare the remote system label with the plurality of authorised entity labels, in response to receiving the second access message; and identify a match between the remote system label and at least one of the plurality of authorised entity labels and, in response, transmit a grant message indicative that the request for access is granted.

In another aspect of the invention, there is a data management system for sharing data associated with a first user, the data management system comprising: a data storage resource configured to store user data associated with the first user; and store an authorised entity database comprising a plurality of authorised entity labels each indicative of an identifier of an authorised entity; and a receiver arranged to receive a first access message, from a remote system, associated with a request for access to the user data, the first access message comprising a remote system label indicative of an identifier of the remote system; a comparison module arranged to compare the remote system label with the plurality of authorised entity labels, in response to receiving the first access message, and cause an identification module to identify a match between the remote system label and at least one of the plurality of authorised entity labels and, in response, cause a transmitter to transmit a grant message indicative that the request for access is granted; wherein the receiver is arranged to receive a second access message, from the remote system, associated with the request for access to the user data, the second access message comprising the remote system label; wherein the comparison module is arranged to compare the remote system label with the plurality of authorised entity labels, in response to receiving the second access message; and cause the identification module to identify a match between the remote system label and at least one of the plurality of authorised entity labels and, in response, cause the transmitter to transmit a grant message indicative that the request for access is granted.

In another aspect of the invention, there is a computer program comprising instructions which, when the program is executed by a computer, cause the computer to carry out the method described herein.

In another aspect of the invention, there is a data carrier signal carrying the computer program described herein.

In another aspect of the invention, there is a computer readable medium which, when the program is executed by a computer, cause the computer to carry out the method described herein.

BRIEF DESCRIPTION OF THE DRAWINGS

Embodiments of the invention will be described, by way of example, with reference to the following drawings, in which.

DETAILED DESCRIPTION

Figure 1:
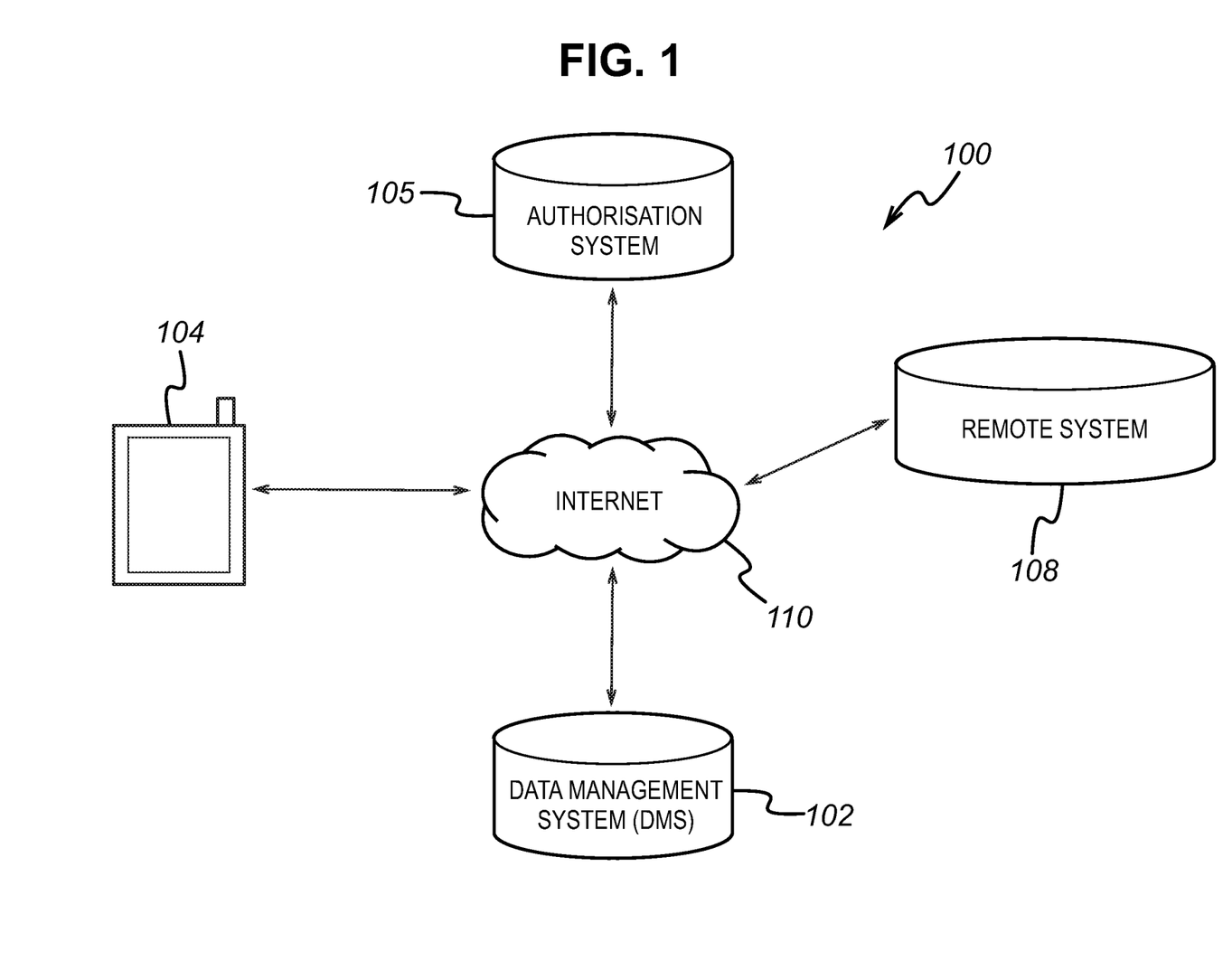
FIG. 1 illustrates the general architecture of a system for authorising access to secure user data.

Referring to FIG. 1, there is a system 100 for managing access to data associated with a first user. The system comprises a data management system (DMS) 102, a first user device 104, an authorisation system 105 and a remote system 108.

The DMS 102 is arranged to store data relating to users of the system 100. Specifically, the DMS 102 stores data that is associated with the first user, and the data may comprise one or more secure data items. Each one of these data items is indicative of private information relating to a user of the DMS 102 (e.g. the first user). In one example, each data item comprises financial data relating to the first user, such as details that enable the first user to make payments or the details of previous financial transactions made by the first user.

The following systems and methods are described in the context of managing access to financial data and payments. However, these systems and methods could be used to manage access to any type of secure data for which access by unauthorised third parties is to be restricted.

In the following examples, data is referred to as being accessible by the first user, and that the data is associated with the first user. For example, the first user may have access to an online user account, such as an online banking account, via an account interface. In this scenario, the first user may be assigned a unique username and a shared secret (e.g. login information), such as a password, that can be used to access the user account via the account interface. Once the first user has accessed the user account, that user is able to access the data via the user account. Therefore, the data is accessible by the first user via login information that is unique to the first user.

The secure data that is accessible by the first user may be accessible by the DMS 102 itself. The secure data may be accessible by the first user only, unless otherwise authorised by first user. In other words, the secure data is prevented from being sent to a device or a system that is remote and distinct from the DMS 102, such as the remote system 108, without the first user providing authorisation to the DMS 102 for the data to be sent to a remote device or system.

The system 100 comprises a first user device 104 which is operated by the first user. The system 100 also comprises a remote system 108 to which the jointly accessible data can be sent.

Each one of the DMS 102, the remote system 108, the authorisation system 105 and the first user device 104 are arranged to communicate with one another via a communications network 110. The communications network 110, in this example, is the Internet 110. However, it will be appreciated that any suitable form of communications network 110 could be used.

Each one of the DMS 102, remote system 108, the first user device 104 and the authorisation system 105 are web-enabled and may comprise a display, a user interface, a processor and memory. The devices and systems 102, 104, 105, 108 can be arranged to communicate data between one another via any suitable communications protocol or connection. For instance, the devices and systems 102, 104, 105, 108 may communicate with one another via a wired and/or a wireless connection.

The first user device 104 may be any suitable type of personal computing device, such as a laptop computer, a desktop computer, a web-enabled telephone, such as a smartphone, or a tablet device. The DMS 102, the authorisation system 105 and the remote system 108 may be any suitable type of computing system or collection of computing systems, such as a server or a collection of servers.

Figure 2:
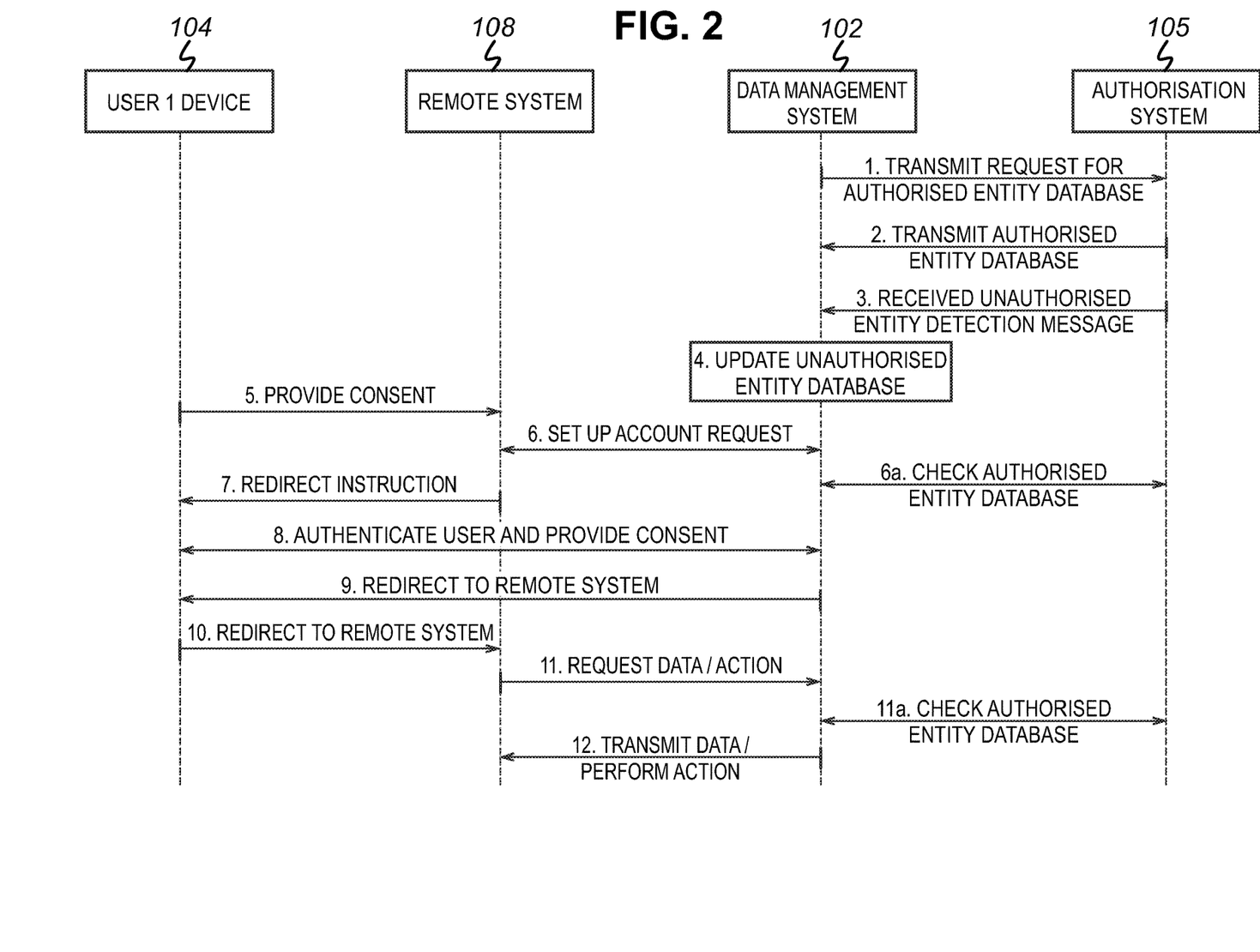
FIG. 2 illustrates a protocol sequence diagram of a computer-implemented method for authorising access to secure user data.

Referring to FIG. 2, there is a method for the first user to enable the remote system 108 to access the secure data stored at the DMS 102 using the first user device 104.

In step 1, the DMS 102 transmits a request to the authorisation system 105 for access to an authorised entity database. The authorised entity database is stored at the authorisation system 105 and comprises a list of entities that are considered to be authorised to access user data. The authorised entities are considered not to be fraudulent, unscrupulous or malicious entities. In other words, the entities on the list of authorised entities are considered to be "safe" in that these entities have been deemed not to impose a risk to a user's security, or at least have been deemed to impose a low risk to a user's security. For instance, each entity may be associated with a security score and if the security score for a particular entity meets a predetermined secure threshold identification details for that entity will be stored on the list of authorised entities. However, if the security score for an entity does not meet the predetermined secure threshold, the identification details for that entity will be not be stored on the list of authorised entities.

The authorised entity database comprises a plurality of labels, each of which are indicative of an identifier for an authorised entity. Therefore, it is possible to determine whether an entity is authorised by comparing its identifier to the identifiers of the authorised entities in the authorised entity database.

In step 2, the authorisation system 105 transmits at least a portion of the authorised entity database to the DMS 102. The authorisation system 105 may transmit the entire authorised entity databased to the DMS 102, so that the DMS 102 can access a complete copy of the authorised entity database. However, a portion of the authorised entity database may be transmitted to the DMS 102 in order to conserve bandwidth usage and storage resources at the DMS 102. For instance, the DMS 102 may require only part of the authorised entity database. In this example, the DMS 102 requests a portion of the database, and the authorisation system 105 responds with the part of the database that was requested. Once the authorised entity database has been received (or a portion thereof), the DMS 102 stores the database locally at a data storage resource at the DMS 102.

In this way, the DMS 102 is able to check a local copy of the authorised entity database instead of consulting the authorisation system 105. The authorisation system 105 is remote and distinct from the DMS 102. Thus, checking the authorisation system 105 in every instance where it is required would impose a burden on the processing resources of DMS 102. In addition, the authorisation system 105 may service other similar systems that require access to the authorised entity database, and in this situation the authorisation system 105 may create a so-called "bottleneck" or single point of failure for the system. Since the DMS 102 obtains a local copy of the authorised entity database, the DMS 102 is able to detect authorised entities more reliably and quickly. This will enhance the ability of the DMS 102 to ensure the security of the user's data.

Steps 1 and 2 may be repeated, so that the local copy of the authorised entity database is kept up to date at the DMS 102. This is advantageous so that the DMS 102 is able to determine which entities are authorised and which entities are not. For instance, at one point in time a particular entity may be considered to be authorised (or to be "safe"). However, this entity may be subject to a security breach, and the authorised entity database may be updated at the authorisation system 105 to remove that entity from the database. If the local copy of the DMS 102 is not updated, and the entity that is no longer authorised attempts to access user data from the DMS 102, then the DMS 102 might transmit the data to the entity which would risk users' information security. In order to assist in alleviating this issue, the DMS 102 may transmit a plurality of requests for the authorised entity database based on a predetermined pattern or time sequence. For instance, the DMS 102 may store a predefined time interval that determines the time interval between subsequent transmissions of the request. This time interval may be configurable, such that an operator of the DMS 102 is able to set the time sequence or pattern. For instance, the operator may increase or decrease the time interval based on system conditions, or the DMS 102 may update the time interval automatically.

The DMS 102 may be used to detect and count incidents of fraud. The time interval may be increased or decreased based on a number of incidents of fraud detected. The time interval may increase, if the number of incidents of fraud detected increases. The time interval may decrease, if the number of incidents of fraud detected decreases.

If the authorisation system 105 does not provide a response to the message sent in step 1, or if the authorisation system 105 does not provide at least a portion of the authorised entity database in response to the message sent in step 1, the DMS 102 does not execute the steps to allow user data to be sent to the remote system 108. For instance, in this scenario the DMS 102 may prevent any one or more of steps 6, 6a, 8, 9 11a and 12 from being executed.

In addition to storing the authorised entity database, the DMS 102 may store an unauthorised entity database. The unauthorised entity database comprises a list of entities that are considered to be unauthorised to access user data. The unauthorised entities are considered be fraudulent, unscrupulous or malicious entities. In other words, the entities on the list of unauthorised entities are considered to be "unsafe" in that these entities have been deemed to impose a risk to a user's security, or have been deemed to impose a high risk to a user's security. For instance, each entity may be associated with a security score and if the security score for a particular entity meets a predetermined unsecure threshold that entity will be stored on the list of unauthorised entities. However, if the security score for an entity does not meet the predetermined unsecure threshold, the entity will be not be stored on the list of unauthorised entities.

The unauthorised entity database comprises a plurality of labels, each of which are indicative of an identifier for an unauthorised entity. Therefore, it is possible to determine whether an entity is unauthorised by comparing the identifier of the entity to the identifiers of the unauthorised entities in the unauthorised entity database.

In step 3, the DMS 102 receives an unauthorised entity detection message. This message may be received from the authorisation system 108, as shown in FIG. 2. However, the message may be received by a different system that is distinct and remote from the DMS 102, or the message may be generated the DMS 102.

The unauthorised entity detection message comprises a label that indicates an identifier of an entity that is unauthorised to receive user data. The label may indicate the identity of an entity that is suspected to be fraudulent, unscrupulous or malicious. In other words, the entity identified in the unauthorised entity detection message has been considered to be "unsafe" in that the entity has been deemed to impose a risk to a user's security, or has been deemed to impose a high risk to a user's security. For instance, the entity identified in the unauthorised entity detection message may be associated with a security score that meets the predetermined unsecure threshold. This determination may be made at the DMS 102 or at a remote system, such as the authorisation system 105. This determination may be made automatically based on security data associated with the entity indicated in the message. The determination may be made manually based on user input.

In step 4, once the unauthorised entity detection message has been received, the DMS 102 updates the unauthorised entity database to include the label from the unauthorised entity detection message. In this way, it is possible for the DMS 102 to update the unauthorised entity database on an ad-hoc basis for specific entities. Therefore, the unauthorised entity database can be maintained in a more efficient and reliable manner.

In step 5, the first user sends a message via the first user device 104 that is indicative of the first user providing their consent for the remote system 108 to access the secure data accessible by the first user which is stored at the DMS 102. The message that provides the first user's consent for access to the secure data is sent from the first user device 104 to the remote system 108. The message in step 5 may be indicative of the first user providing consent for a payment to be made from a bank account to which the first user has access.

In step 6, the remote system 108 connects to the DMS 102. In this step, the remote system 108 creates an account request resource. This informs the DMS 102 that one of its users is granting the remote system 108 with access to data associated with the online account of that user. In this step, the DMS 102 responds with an identifier for the resource. This step is carried out by the remote system 108 making a POST request, which is supported by the Hypertext Transfer Protocol, to an endpoint at the DMS 102. If the message in step 5 is indicative of the first user providing consent for a payment, in step 5 a payment resource is created with a corresponding identifier for the payment resource.

In step 6, an account request setup payload is sent from the remote system 108 to the DMS 102, which comprises fields describing the data that the first user has consented for the remote system 108 to access. The fields in the setup payload may comprise a permissions field, an expiration date field and a period field. The permissions field comprises an identifier for a data cluster or a list of identifiers for data clusters that the first user has consented for the remote system 108 to access. The expiration date field comprises an optional expiration time at which point the remote system 108 will be prevented from accessing the first user's data stored at the DMS 102. The period field comprises a date/time range which can be used to only provide access to data items stored at the DMS 102 that are associated with dates/times that fall within the date/time range. For example, the period field may specify a transaction history period. The DMS 102 uses the transaction history period to determine that the remote system 108 is only to have access to the transactions that were made within the transaction history period. The remote system 108 may send multiple account requests for the same user, with different setup payloads in each request.

In step 6, the remote system 108 transmits a label/identifier that indicates the identity of the remote system 108. Then, in step 6a the DMS 102 compares the identity of the remote system 108 with the identities of the entities stored in the authorised entity database. If the identity of the remote system 108 matches the identity of an entity in the authorised entity database, the DMS 102 indicates that the setup account request is granted. For instance, if the identity of the remote system 108 matches the identity of an entity in the authorised entity database, the DMS 102 transmits the identifier for the resource to the remote system 108.

Alternatively, if the identity of the remote system 108 does not match the identity of an entity in the authorised entity database, the DMS 102 prevents the setup account request from being granted. For instance, if the identity of the remote system 108 does not match the identity of an entity in the authorised entity database, the DMS 102 does not transmit the identifier for the resource to the remote system 108. The DMS 102 may transmit a failure or request rejection message to the remote system 108, if the remote system is not on the authorised entity database.

In step 6a, the DMS 102 may also compare the identity of the remote system 108 with the identities of the entities stored in the unauthorised entity database. This may occur locally at the DMS 102 using the local copy of the authorised database, or the DMS 102 may interface with the authorisation system 105 for the comparison. The DMS 102 may execute the comparison based on both the local authorised entity database and authorised entity database stored at the authorisation system. If the identity of the remote system 108 does not match the identity of an entity in the unauthorised entity database, the DMS 102 indicates that the setup account request is granted. For instance, if the identity of the remote system 108 does not match the identity of an entity in the unauthorised entity database, the DMS 102 transmits the identifier for the resource to the remote system 108.

Alternatively, if the identity of the remote system 108 does match the identity of an entity in the unauthorised entity database, the DMS 102 prevents the setup account request from being granted. For instance, if the identity of the remote system 108 does match the identity of an entity in the unauthorised entity database, the DMS 102 does not transmit the identifier for the resource to the remote system 108. The DMS 102 may transmit a failure or request rejection message to the remote system 108, if the remote system is listed on the unauthorised entity database.

In step 7, if the account request has been completed, the remote system transmits a redirect message to the first user device 104 that instructs the device 104 to be redirected to the DMS 102. The redirect message includes an account request identifier associated with the account request established in step 6. The account request identifier allows the DMS 102 to correlate messages transmitted from the first user device 104 with the account request that was setup in step 6.

In step 7, the first user device 104 is redirected to the DMS 102. For instance, the first user, is redirected to a web-page or an application through which the first user is able to access their online account. When the first user device 104 is redirected to the DMS 102, the first user device 104 provides the account request identifier to the DMS 102. This allows the DMS 102 to correlate messages from the first user device 104 with the account request of step 6.

In step 8, the DMS 102 authenticates the first user via the first user device 104. This can occur by the first user inputting their login information into the web-page or the application using the first user device 104. Once the user has been authenticated the user is able to provide their consent for the remote system 108 to access their data or to authorise the payment request. Then, the DMS 102 updates the state of the account request resource to indicate that the account request has been authorised by the first user. This may involve setting a flag associated with the first user to indicate that the data is authorised to be shared with the remote system 108, where previously the flag was set to indicate that the data is not authorised to be shared with the remote system 108.

The online user account may comprise a plurality of sub-accounts. For instance, the user's online banking account may comprise different sub-accounts, such as a current account and a savings account. During authorisation, the first user selects accounts that are authorised for the remote system 108 to access. This selection may be executed by the first user via a user interface at the first user device 104.

In the method, the consent for data to be shared is managed in step 5 between the first user and the remote system 108. Thus, the first user cannot change the details of the account request by interacting with the DMS 102 in step 8. The first user will only be able to authorise or reject the account request details in its entirety in step 8. In order for the first user to change the details of the account request, it is necessary for step 5 to be repeated with different consent parameters provided by the first user.

In steps 9 and 10, the first user device 104 is redirected back to the remote system 108.

In step 11, the remote system 108 transmits a request for access to the secure data item. This is carried out by making a GET request, which is supported by the Hypertext Transfer Protocol, to the relevant resource at the DMS 102. If payment consent was provided in step 5, the remote system transmits a request for the payment to be made. This is carried out by making a POST request, which is supported by the Hypertext Transfer Protocol, to the relevant resource at the DMS 102. The request in step 11 comprises an identifier for the remote system 108 that the DMS 102 can use to compare against the authorised entity database and the unauthorised entity database in order to determine whether the remote system 108 is authorised to access the secure data.

In step 11a, the DMS 102 compares the identity of the remote system 108 with the identities of the entities stored in the authorised entity database. This may occur locally at the DMS 102 using the local copy of the authorised database, or the DMS 102 may interface with the authorisation system 105 for the comparison. The DMS 102 may execute the comparison based on both the local authorised entity database and authorised entity database stored at the authorisation system. If the identity of the remote system 108 matches the identity of an entity in the authorised entity database, the DMS 102 indicates that the request from step 11 is granted. For instance, if the identity of the remote system 108 matches the identity of an entity in the authorised entity database, the DMS 102 proceeds to step 12.

Alternatively, if the identity of the remote system 108 does not match the identity of an entity in the authorised entity database, the DMS 102 prevents the request of step 11 from being granted. The DMS 102 may transmit a failure or request rejection message to the remote system 108, if the remote system is not listed on the authorised entity database.

In step 11a, the DMS 102 may also compare the identity of the remote system 108 with the identities of the entities stored in the unauthorised entity database. If the identity of the remote system 108 does not match the identity of an entity in the unauthorised entity database, the DMS 102 indicates that the request of step 11 is granted. For instance, if the identity of the remote system 108 does not match the identity of an entity in the unauthorised entity database, the DMS 102 proceeds to step 12.

Alternatively, if the identity of the remote system 108 does match the identity of an entity in the unauthorised entity database, the DMS 102 prevents the request of step 11 from being granted. The DMS 102 may transmit a failure or request rejection message to the remote system 108, if the remote system is listed on the unauthorised entity database.

In step 12, if the first user has provided consent and the remote system 108 is listed on the authorised entity database but not listed on the unauthorised entity database, the secure data item that is accessible by the first user is transmitted from the DMS 102 to the remote system 108, or if a payment was requested the payment is made.

The above example, has been described in the context of providing and granting consent for the first user's data to be transferred. However, the above method could be implemented as a mechanism for providing and granting consent for the first user to make a payment via the remote system 108 from the first user's bank account.

Figure 3:
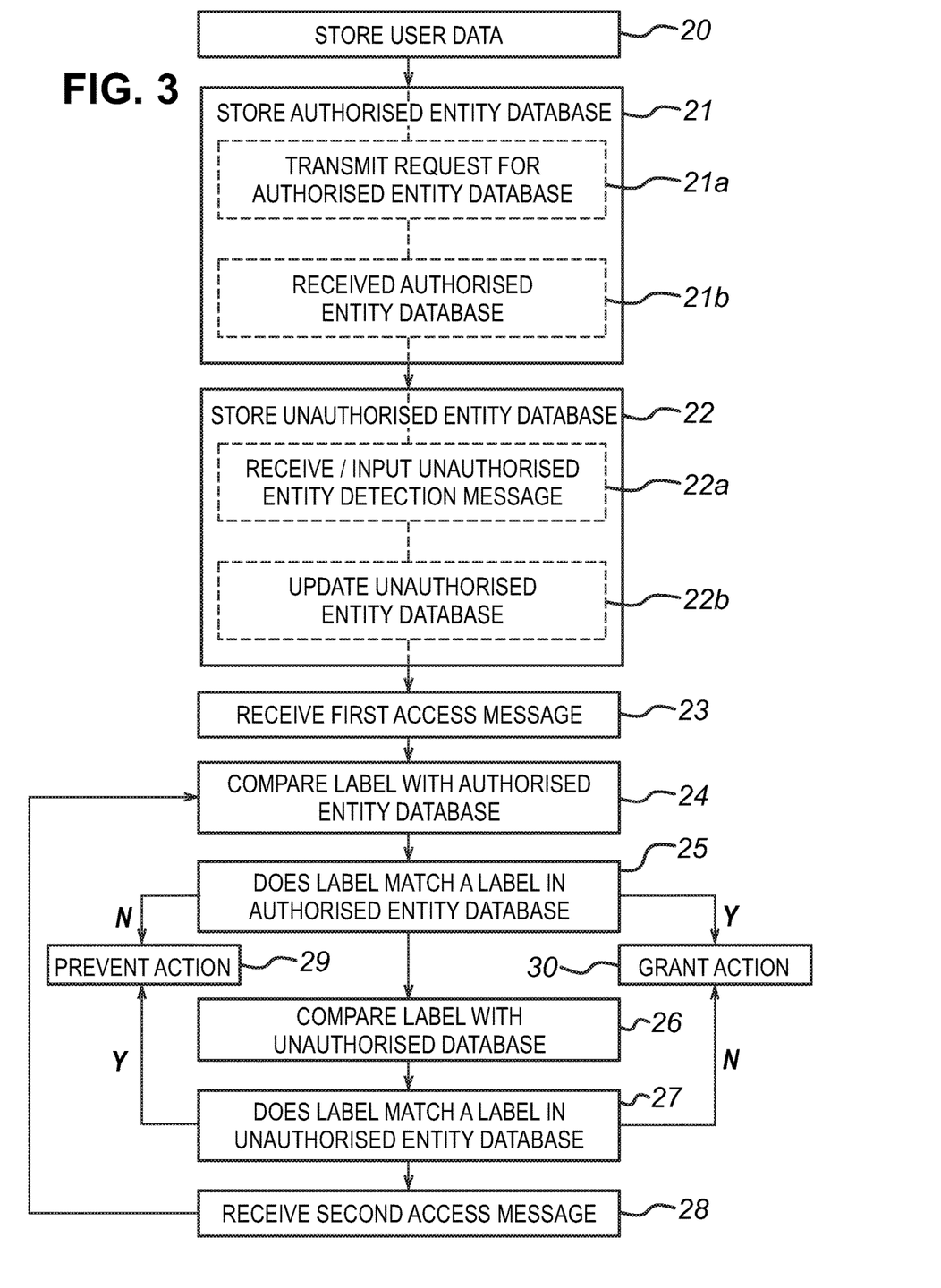
FIG. 3 illustrates a flow chart of a computer-implemented method performed by the system for authorising access to secure user data.

FIG. 3 shows a flow chart illustrating, at an overview level, a method of sharing the secure data item accessible by the first user with the remote system 108.

In step 20, secure data that is associated with the first user is stored at a data storage resource at the DMS 102. The first user may have access to the secure data via an online user account, such as an online banking account, via an account interface as discussed above. The secure data may comprise financial data indicative of previously executed transactions linked with an account belonging to the first user, or payment data enabling a payment to be initiated from an account belonging to the first user.

In step 21, an authorised entity database is stored at the data storage resource at the DMS 102. The authorised entity database comprises a plurality of authorised entity labels each indicative of an identifier of an authorised entity.

Optionally, in steps 21a and 21b the DMS 102 requests and stores a local copy of the authorised entity database. In step 21a, the DMS 102 transmits a request to the authorisation system 108 to access the authorised entity database stored at the authorisation system 108.

The DMS 102 may transmit a plurality of the requests of step 21a in a predefined sequence. The predefined time sequence may be configurable at the DMS 102. For instance, each of the requests may be transmitted sequentially with a predetermined time interval between each successive request.

In step 21b, in response to each request transmitted in step 21a the DMS 102 receives and stores at least a portion of the authorised entity database.

In step 22, an unauthorised entity database is stored at the DMS 102. The unauthorised entity database comprises a plurality of unauthorised entity labels each indicative of an identifier of an unauthorised entity;

Optionally, in step 22a the DMS 102 receives an unauthorised entity detection message. The message may be received via an input at the DMS 102. The unauthorised detection message comprise a label indicative of an identifier of an entity suspected of fraudulent activity and/or suspected of being subject to a security breach. In step 22b, the unauthorised entity data is updated by storing the label from the unauthorised entity detection message as an unauthorised entity label indicative of an identifier of an unauthorised entity. This label is stored in the unauthorised entity database.

In step 23, the DMS 102 receives a first access message, from the remote system 108, associated with a request for access to the user data stored at the first system. The first access message comprises a label indicative of an identifier of the remote system 108.

In step 24, in response to receiving the first access message, the DMS 102 compares the label for the remote system 108 with the plurality of authorised entity labels in the authorised entity database.

In step 25, if the label for the remote system 108 is not stored in the authorised entity database, the method proceeds to step 29 in which the DMS 102 does not perform the action requested in step 23. On the other hand, if the label for the remote system 108 is stored in the authorised entity database, the method proceeds to step 30 in which the DMS 102 performs the action requested in step 23.

Optionally, the DMS 102 may require that the label for the remote system 108 is compared with the unauthorised entity database. In this case, the method proceeds to step 26.

In step 26, the DMS 102 compares the label for the remote system 108 with the plurality of unauthorised entity labels in the unauthorised entity database.

In step 27, if the label for the remote system is stored in unauthorised entity database, the method proceed to step 29 in which the DMS 102 does not perform the action requested in step 23. On the other hand, if the label for the remote system 108 is not stored in the unauthorised entity database, the method proceeds to step 30 in which the DMS 102 performs the action requested in step 23.

Optionally, the DMS 102 may receive a second access message before granting the action as in step 30. In the case, steps 24, 25, 26, 27, 29 and 30 are repeated. However, the label received in the second request is used for the comparison with the unauthorised and authorised entity databases in this instance.

Figure 4:
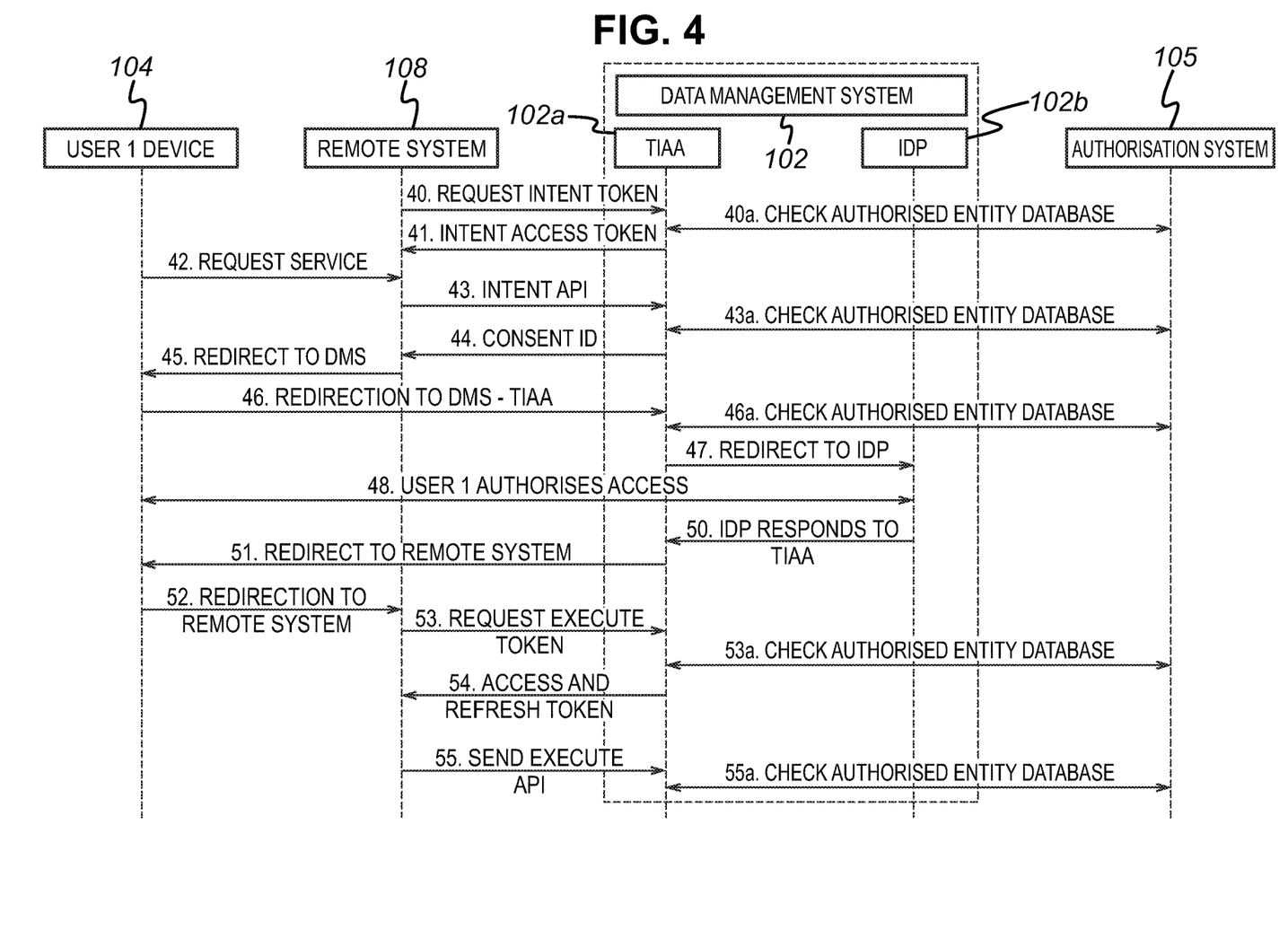
FIG. 4 illustrates a protocol sequence diagram of the computer-implemented method for authorising access to secure user data.

FIG. 4 shows a protocol sequence diagram which illustrates the method described with reference to FIG. 2 in greater detail. Referring the FIG. 4, the DMS 102 described above further comprises a trusted identity and attribute authority 102a (TIAA) and an identity provider 102b (IDP).

In steps 40, 40a and 41, the remote system 108 and the DMS 102 interact in order for an intent token to be transmitted to the remote system 108. Specifically, in step 40 the remote system 108 transmits a request for an access token to the TIAA 102a at the DMS 102. The access token being requested is a web token that is configured to enable the remote system 108 to send an intent application programming interface (API) to the DMS 102.

The access token requested by the remote system 108 will be valid for a predetermined period of time. Thus, the access token can be used more than once by the remote system 108. In this example, the web token is a JavaScript Object Notation (JSON) web token.

In step 40, the request for the access token is transmitted directly to the TIAA 102a, and the request comprises a client identifier and a client secret. The client identifier and the client secret are previously assigned to the remote system 108, when the remote system 108 registers with the DMS 102. The TIAA 102a validates the client identifier and the client secret in order to authenticate the remote system 108.

In step 40a, the DMS 102 compares the identity of the remote system 108 with the identities stored on the authorised entity database and/or the identities stored on the unauthorised entity database. The DMS 102 may execute this comparison by interfacing with the authorisation system or by referencing the local copies of the authorised entity database and/or the unauthorised entity database. Step 40a may occur in a similar manner to that described with reference to step 6a above and/or in a similar manner to that described with reference to steps 24, 25, 26, 27, 29 and 30 above. In step 40a, if the remote system 108 is determined to be an authorised entity and/or not an unauthorised entity, the method proceeds to step 41.

In step 41, the TIAA 102a generates an intent access token and transmits the intent access token to the remote system 108.

In step 42, the first user transmits a message to the remote system 108 indicating that the first user has requested for the DMS 102 is to transmit a secure data item to the remote system 108. In this example, the secure data is a data item that is accessible by the first user via an account interface of a shared online data storage account. The message may indicate an instruction for a payment to be made using a bank account accessible by the first user at the DMS 102.

In step 43, the remote system 108 transmits an external consent intent API, and the remote system 108 transmits the intent access token provided previously in response to the request from the first user in step 42. The remote system 108 also sends the details of the user's consent request, such as the account type, period of time, permissions, as described with reference to the account request setup payload in step 2 of FIG. 2. If the message in step 42 indicates a payment instruction, the remote system 108 transmits a transaction identifier to the DMS 102. In step 43, the TIAA 102a receives the external consent intent API and validates the corresponding intent access token.

In step 43a, the identity of the remote system 108 is authenticated in order to determine whether the remote system 108 is an authorised entity and/or an unauthorised entity. If the remote system is not an authorised entity or the intent access token is not valid, the external consent intent API will be rejected, and an error code is returned to the remote system 108. If the remote system is an unauthorised entity or the intent access token is not valid, the external consent intent API will be rejected, and an error code is returned to the remote system 108. Step 43a occurs in a similar manner to that of step 40a.

Further in step 43, the DMS 102 uses an internal consent intent API, which generates a unique consent identifier that corresponds with the request received from the remote system 108 and remains valid throughout the lifecycle of the request. The internal consent API stores the details of the intent in a consent database in association with the consent identifier. Then in step 44 the DMS 102 returns the consent identifier to the remote system 108.

In step 45, once the remote system 108 has received the consent identifier from the consent intent API, the remote system 108 retrieves a redirect URL from a registry which points to the TIAA 102a. In this step, the remote system 108 redirects first user device 104 to the TIAA 102a with the client identifier, the consent identifier and the details of the user's consent request. This information is sent using OAuth 2.0.

In step 46, the first user device 104 is redirected to the TIAA 102a, which validates the client identifier and the details of the user's consent request. In step 46a, the identity of the remote system 108 is authenticated again as in steps 40a and 43a.

In step 47, the TIAA 102a transmits a redirect uniform resource identifier (URI) to the first user device 104 and a first reference code. This redirects the first user device 104 to the IDP 102b along with the first reference code. In turn, the IDP 102b transmits a request to the TIAA 102a for the consent identifier and the details of the user's consent request. Then, it is necessary for the IDP 102b to obtain a linking identifier. The IDP 102b will then call an API for obtaining the linking identifier. In addition, a call to the TIAA 102*b* is required to translate the client identifier and the remote system 108 identifier into textual names.

In step 48, the first user is prompted to authenticate their identity. For instance, the first user is prompted to input their unique login information via a user interface. The first user then operates the user interface of the online account to navigate to a consent page or area. At that point, an internal authorisation API for obtaining the first user's consent is configured to match the request with the data previously received via the consent intent API to obtain the full consent that the customer is being asked to authorise. This is achieved via the linking identifier or via a direct deep link approach (for mobile devices only) using the consent identifier directly.

In step 48, the IDP 102*b* constructs a list of accounts that the first user can select. This will be constructed by generating a list of all accounts to which the first user has access to the data of, or the accounts from which the user can make a payment, or the accounts that are enabled for data sharing. For instance, certain account types may be enabled or disabled for sharing data. The enabled account types will appear in the list, while the disabled account types will not appear in the list. In this step, the first user is presented with the consent that they have requested and the list of accounts for the first user to choose from. Next, the customer authorises the consent, and since the user has been authenticated, an identifier for the first user will be known. The authorisation received from the user will be digitally signed within the IDP 102*b* and will be stored in associated with the authorised consent.

In step 50, the first user device is redirected back to the TIAA 102*a*.

In step 51, the TIAA 102*a* sends an authorisation code and a URI to the first user device. The URI is assigned to the remote system 108 when the remote system 108 registers with the DMS 102 initially and is used to redirect the first user device to the remote system 108.

In step 52, the first user device 10 is redirected to the remote system 108.

In step 53, the authorisation code is sent by the remote system 108 to the TIAA 102*a* which validates the authorisation code and the identity of the remote system 108. In steps 53*a*, the identity of the remote system 108 is authenticated again as in steps 40*a*, 43*a* and 46*a*.

In step 54, the TIAA 102*a* transmits an access token and a refresh token to the remote system 108. On subsequent requests, the remote system 108 will transmit the refresh token rather than the authorisation code. After validation, the TIAA 102*a* will issue a new access token and a new refresh token.

In step 55, the remote system 108 transmits an external execute API to the DMS 102, which matches the details held in the authorised consent. In this step, the secure data item that is jointly accessible by the first user and the second user is transmitted to the remote system 108. In steps 55*a*, the identity of the remote system 108 is authenticated again in a similar manner to that described above.

The consent identifier is passed to an internal execute API at the DMS 102, which will call an internal validate authorised consent API using the consent identifier along with any additional data required from the execute API to match against the Authorised Consent (such as the account number, and payment details).

The validate authorised consent API will then check that the consent identifier exists and has not expired. The validate authorised consent API will also check that any details passed match the authorised consent. This may include checking that the API being executed within scope of the user's authorisation that have been authorised, that the account being requested within the accounts have been authorised.

The validate Authorised consent API will pass back a success or failure message to the calling execute API. For a success message, the API will also pass back the translation from the consent customer identifier to the actual customer identifier as used by the IDP 102*b*, the consent account identifier to the actual account identifier, and any other data that was saved at the point of authorisation (e.g. a biometrics score for detecting fraud).

Figure 5:
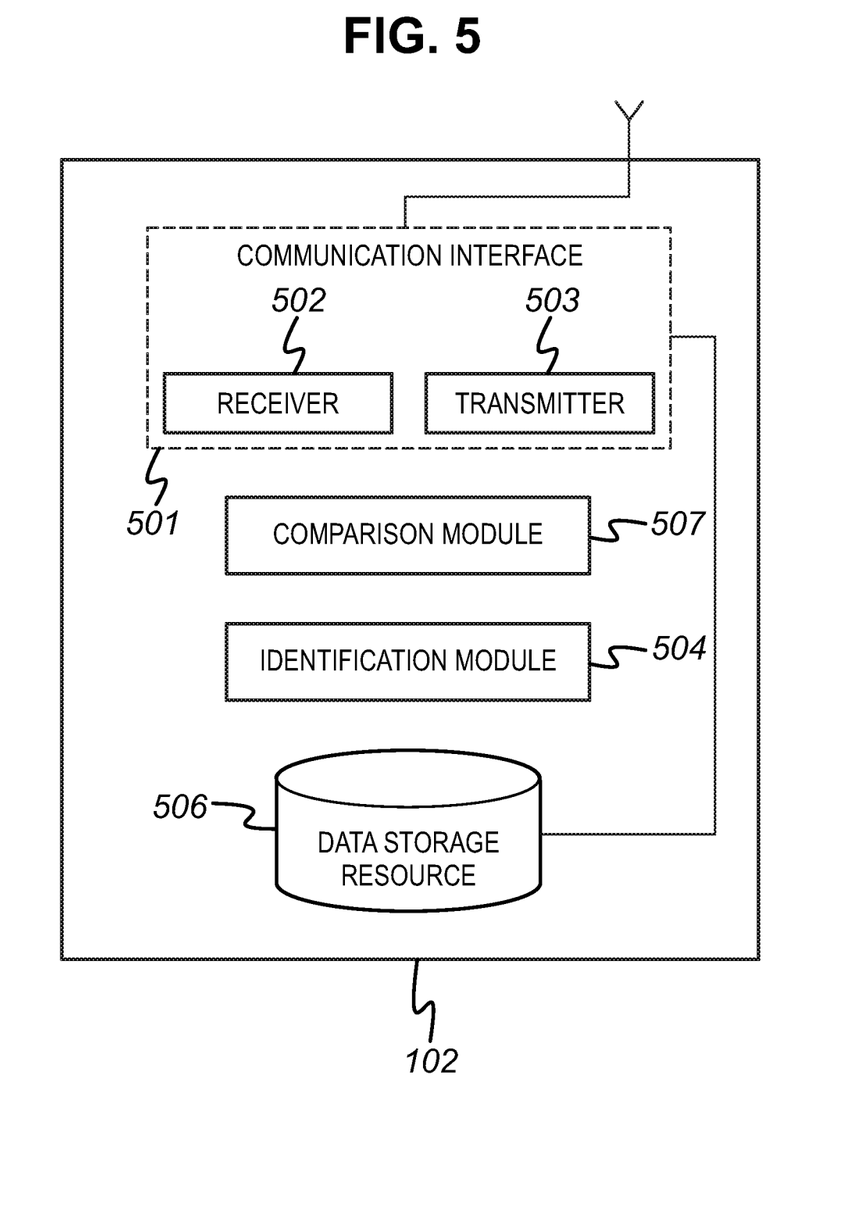
FIG. 5 illustrates a schematic diagram of a data management system.

Referring to FIG. 5, the DMS 102 comprises a communication interface 501 comprising a receiver 502 and a transmitter 503. The DMS 102 also comprises an identification module 504, a comparison module 505 and a data storage resource 506.

The receiver 502 and the transmitter 503 are configured to receive and transmit the messages to and from the DMS 102 as explained above. The comparison module 507 is arranged to compare a label with the labels stored in the authorised entity database or the unauthorised entity database, as explained above. The identification module 504 is arranged to identify whether a label is stored on the authorised entity database or the unauthorised entity database, as explained above. The data storage resource 506 is arranged to store the secure data items at the DMS 102.

Figure 6:
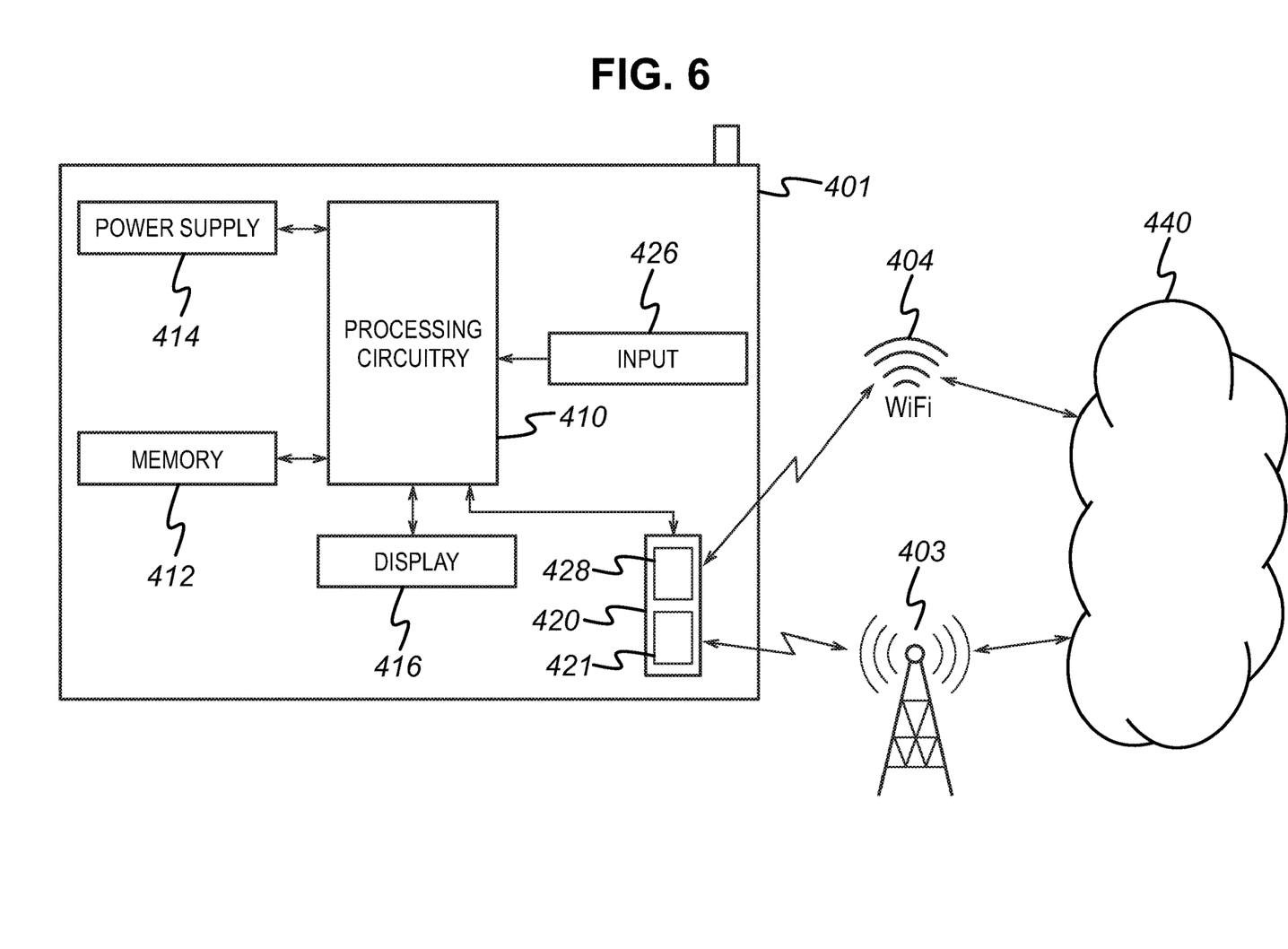
FIG. 6 illustrates a schematic diagram of an example device in the system.

FIG. 6 shows an exemplary electronic device 401 according to any of the electronic devices or systems of this disclosure (such as the first user device 102, the authorisation system 105, the remote system 108, the DMS 102, the TIAA 102*a* or the IDP 102*b*). The electronic device 401 comprises processing circuitry 410 (such as a microprocessor) and a memory 412. Electronic device 401 may also comprise one or more of the following subsystems: a power supply 414, a display 416, a transceiver 420, and an input 426.

Processing circuitry 410 may control the operation of the electronic device 401 and the connected subsystems to which the processing circuitry is communicatively coupled. Memory 412 may comprise one or more of random access memory (RAM), read only memory (ROM), non-volatile random access memory (NVRAM), flash memory, other volatile memory, and other non-volatile memory.

Display 416 may be communicatively coupled with the processing circuitry 410, which may be configured to cause the display 416 to output images representative of the secure data shared between the entities in the system 100.

The display 416 may comprise a touch sensitive interface, such as a touch screen display. The display 416 may be used to interact with software that runs on the processor 410 of the electronic device 401. The touch sensitive interface permits a user to provide input to the processing circuitry 410 via a discreet touch, touches, or one or more gestures for controlling the operation of the processing circuitry and the functions described herein. It will be appreciated that other forms of input interface may additionally or alternatively be employed for the same purpose, such as the input 426 which may comprise a keyboard or a mouse at the input device.

The transceiver 420 may be one or more long-range RF transceivers that are configured to operate according to communication standard such as LTE, UMTS, 3G, EDGE, GPRS, GSM, and Wi-Fi. For example, electronic device 401 may comprise a first wireless transceiver 421, such as a cellular transceiver, that is configured to communicate with a cell tower 403 via to a cellular data protocol such as LTE, UMTS, 3G, EDGE, GPRS, or GSM, and a second transceiver 428, such as a Wi-Fi transceiver, that is configured to communicate with a wireless access point 404 via to a Wi-Fi standard such as 802.11 ac/n/g/b/a. In this regard and for the purposes of all embodiments herein concerning a long-range wireless protocol, a long-range wireless protocol may be a protocol which is capable and designed for communication over 5, 10, 20, 30, 40, 50, or 100 m. This is in contrast to short-range wireless protocol mentioned above. The long-range wireless protocol may communicate utilizing higher power than the short-range wireless protocol. The range (e.g. line of sight distance) between the long-range end nodes (electronic device and router or base station) for the long-range wireless protocol may be greater than the range (e.g. line of sight distance) between the short-range end nodes (e.g. electronic device and wireless beacon).

Electronic device 401 may be configured to communicate via the transceiver 420 with a network 440. Network 440 may be a wide area network, such as the Internet, or a local area network. Electronic device 401 may be further configured to communicate via the transceiver 420 and network 440 with one or more systems 14 or user devices 11, 12, 13. These servers or user devices may be any one of those described herein.

The term "comprising" encompasses "including" as well as "consisting" e.g. a composition "comprising" X may consist exclusively of X or may include something additional e.g. X+Y.

Unless otherwise indicated each embodiment as described herein may be combined with another embodiment as described herein.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc and do not include propagated signals. The software can be suitable for execution on a parallel processor or a serial processor such that the method steps may be carried out in any suitable order, or simultaneously. This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

It will be appreciated that the modules described herein may be implemented in hardware or in software. Furthermore, the modules may be implemented at various locations throughout the system.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought. Any of the module described above may be implemented in hardware or software.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the scope of this invention.

LIST OF NUMBERED EMBODIMENTS

1. A computer-implemented method for sharing data associated with a first user, the method comprising:

storing, at a first system, user data associated with the first user;

storing, at the first system, an authorised entity database comprising a plurality of authorised entity labels each indicative of an identifier of an authorised entity;

storing, at the first system, an unauthorised entity database comprising a plurality of unauthorised entity labels each indicative of an identifier of an unauthorised entity;

receiving a first access message, from a second system, associated with a request for access to the user data stored at the first system, the first access message comprising a second system label indicative of an identifier of the second system;

in response to receiving the first access message, comparing the second system label with the plurality of authorised entity labels and the plurality of unauthorised entity labels stored at the first system;

in response to identifying that the second system label matches an authorised entity label and that the second system label does not match an unauthorised entity label, transmitting a grant message indicative that the request for access is granted; and preventing transmission of the grant message, if the second system label in the first access message matches an unauthorised entity label and/or does not match an authorised entity label.

2. The computer-implemented method of embodiment 1, wherein storing the authorised entity database at the first system comprises:

transmitting, from the first system to an authorisation system, a request to access an authorised entity database stored at the authorisation system;

receiving and storing, at the first system, at least a portion of the authorised entity database in response to the request to access the authorised entity database.

3. The computer-implemented method of embodiment 1 further comprising:

transmitting, from the first system to an authorisation system, a plurality of requests to access an authorised entity database stored at the authorisation system;

receiving and storing, at the first system, at least a portion of the authorised entity database in response to each one of the plurality of requests to access an authorised entity database;

wherein the plurality of requests to access the authorised entity database are transmitted in a predefined time sequence.

4. The computer-implemented method of embodiment 3, wherein the predefined time sequence is configurable at the first system.

5. The computer-implemented method of embodiment 3 or embodiment 4, wherein the predefined time sequence comprises a predefined time interval between each adjacent one of the requests to access the authorised entity database.

6. The computer-implemented method of any of the preceding embodiments, wherein the first access message comprises a request for an intent web token which validates a request for access to the user data stored at the first system.

7. The computer-implemented method of any one of embodiments 1 to 5, wherein the first access message comprises a request for access to the user data stored at the first system.

8. The computer-implemented method of any one of embodiments 1 to 5, wherein the first access message comprises a request to redirect the first user device to the first device for the first user to provide authorisation for the second system to access the user data.

9. The computer-implemented method of any one of the preceding embodiments further comprising:

receiving a second access message, from the second system, associated with the request for access to the user data stored at the first system, the second access message comprising the second system label;

in response to receiving the second access message, comparing the second system label with the plurality of authorised entity labels stored at the first system and identifying a match between the second system label and at least one of the plurality of authorised entity labels stored at the first system and, in response, transmitting a grant message indicative that the request for access is granted.

10. The computer-implemented method of embodiment 9, wherein the second access message comprises a request for an execute web token which validates a request for the first system to transmit the user data to the second system.

11. The computer-implemented method of embodiment 9, wherein the second access message comprises a request for the first system to transmit the user data to the second system.

12. The computer-implemented method of any one of embodiments 9 to 11, further comprising:

in response to receiving the second access message, comparing the second system label with the plurality of unauthorised entity labels stored at the first system and not identifying a match between the second system label and at least one of the plurality of unauthorised entity labels stored at the first system and, in response, transmitting a grant message indicative that the request for access is granted.

13. The computer-implemented method of any one of embodiments 9 to 12, further comprising:

in response to receiving the second access message, comparing the second system label with the plurality of unauthorised entity labels stored at the first system and identifying a match between the second system label and at least one of the plurality of unauthorised entity labels stored at the first system and, in response, preventing transmission of the grant message.

14. The computer-implemented method of embodiment 13, further comprising:

in response to receiving the second access message, comparing the second system label with the plurality of authorised entity labels stored at the first system and not identifying a match between the second system label and at least one of the plurality of authorised entity labels stored at the first system and, in response, preventing transmission of the grant message.

15. The computer-implemented method of any one of the preceding embodiments further comprising:

receiving or inputting, at the first system, an unauthorised entity detection message comprising a label indicative of an identifier of an entity suspected of fraudulent activity and/or suspected of being subject to a security breach;

storing, in the unauthorised entity database at the first system, the label from the unauthorised entity detection message as an unauthorised entity label indicative of an identifier of an unauthorised entity.

16. The computer-implemented method of any one of the preceding embodiments, wherein the user data associated with the first user comprises:

financial data indicative of previously executed transactions linked with an account belonging to the first user; or payment data enabling a payment to be initiated from an account belonging to the first user.

17. A computer program comprising instructions which, when the program is executed by a computer, cause the computer to carry out the method of any one of the preceding embodiments.

18. A data carrier signal carrying the computer program of embodiment 17.

19. A computer readable medium which, when the program is executed by a computer, cause the computer to carry out the method of any one of embodiments 1 to 16.

20. A data management system for sharing data associated with a first user, the data management system comprising:

a data storage resource configured to:

store user data associated with the first user;

store an authorised entity database comprising a plurality of authorised entity labels each indicative of an identifier of an authorised entity; and store an unauthorised entity database comprising a plurality of unauthorised entity labels each indicative of an identifier of an unauthorised entity; and wherein the data management system further comprises processing circuitry configured to:

receive a first access message, from a remote system, associated with a request for access to the user data stored at the first system, the first access message comprising a remote system label indicative of an identifier of the remote system;

compare the remote system label with the plurality of authorised entity labels and the plurality of unauthorised entity labels stored at the first system, in response to receiving the first access message;

transmit a grant message indicative that the request for access is granted, in response to identifying that the remote system label matches an authorised entity label and that the remote system label does not match an unauthorised entity label; and prevent transmission of the grant message, if the remote system label in the first access message matches an unauthorised entity label and/or does not match an authorised entity label.

21. A data management system for sharing data associated with a first user, the data management system comprising:

a data storage resource configured to:

store user data associated with the first user;

store an authorised entity database comprising a plurality of authorised entity labels each indicative of an identifier of an authorised entity; and store an unauthorised entity database comprising a plurality of unauthorised entity labels each indicative of an identifier of an unauthorised entity;

a receiver arranged to receive a first access message, from an remote system, associated with a request for access to the user data stored at the first system, the first access message comprising a remote system label indicative of an identifier of the remote system;

a comparison module arranged to compare the remote system label with the plurality of authorised entity labels and the plurality of unauthorised entity labels stored at the data storage resource in response to receiving the first access message; and a transmitter arranged to transmit a grant message indicative that the request for access is granted in response to identifying that the remote system label matches an authorised entity label and that the remote system label does not match an unauthorised entity label; and wherein the transmitter is arranged to prevent transmission of the grant message, if the remote system label in the first access message matches an unauthorised entity label and/or does not match an authorised entity label.

22. A computer-implemented method for sharing data associated with a first user, the method comprising:

storing, at a first system, user data associated with the first user;

transmitting, from the first system to an authorisation system, a request to access an authorised entity database stored at the authorisation system, wherein the authorised entity database comprises a plurality of authorised entity labels each indicative of an identifier of an authorised entity;

receiving and storing, at the first system, at least a portion of the authorised entity database;

receiving an access message, from a second system, associated with a request for access to the data stored at the first system, the access message comprising a second system label indicative of an identifier of the second system;

in response to receiving the access message, comparing the second system label with the plurality of authorised entity labels stored at the first system;

identifying a match between the second system label and at least one of the plurality of authorised entity labels stored at the first system and, in response, transmitting a grant message indicative that the request for access is granted.

23. A computer program comprising instructions which, when the program is executed by a computer, cause the computer to carry out the method of embodiment 22.

24. A data carrier signal carrying the computer program of embodiment 23.

25. A computer readable medium which, when the program is executed by a computer, cause the computer to carry out the method of any one of embodiment 22.

26. A data management system for sharing data associated with a first user, the data management system comprising:

a data storage resource configured to:

store user data associated with the first user;

wherein the data management system further comprises processing circuitry configured to:

transmit, from the data management system to an authorisation system, a request to access an authorised entity database stored at the authorisation system, wherein the authorised entity database comprises a plurality of authorised entity labels each indicative of an identifier of an authorised entity;

receiving and storing, at the data management system, at least a portion of the authorised entity database;

receiving an access message, from a remote system, associated with a request for access to the data stored at the data management system, the access message comprising a remote system label indicative of an identifier of the remote system;

in response to receiving the access message, comparing the remote system label with the plurality of authorised entity labels stored at the data management system;

identifying a match between the remote system label and at least one of the plurality of authorised entity labels stored at the data management system and, in response, transmitting a grant message indicative that the request for access is granted.

27. A data management system for sharing data associated with a first user, the data management system comprising:

a data storage resource configured to store user data associated with the first user;

a transmitter arranged to transmit, from the data management system to an authorisation system, a request to access an authorised entity database stored at the authorisation system, wherein the authorised entity database comprises a plurality of authorised entity labels each indicative of an identifier of an authorised entity;

a receiver arranged to receive at least a portion of the authorised entity database, wherein the data storage resource is arranged to store the at a portion of the authorised entity database;

wherein the receiver is arranged to receive an access message, from a remote system, associated with a request for access to the data stored at the data management system, the access message comprising a remote system label indicative of an identifier of the remote system;

a comparison module arranged to compare the remote system label with the plurality of authorised entity labels stored at the data management system, in response to receiving the access message; and an identification module arranged to identify a match between the remote system label and at least one of the plurality of authorised entity labels stored at the data management system and, in response, cause the transmitter to transmit a grant message indicative that the request for access is granted.

28. A computer-implemented method for sharing data associated with a first user, the method comprising:

storing, at a first system, user data associated with the first user;

storing, at the first system, an authorised entity database comprising a plurality of authorised entity labels each indicative of an identifier of an authorised entity;

receiving a first access message, from a second system, associated with a request for access to the user data stored at the first system, the first access message comprising a second system label indicative of an identifier of the second system;

in response to receiving the first access message, comparing the second system label with the plurality of authorised entity labels stored at the first system and identifying a match between the second system label and at least one of the plurality of authorised entity labels stored at the first system and, in response, transmitting a grant message indicative that the request for access is granted;

receiving a second access message, from the second system, associated with the request for access to the user data stored at the first system, the second access message comprising the second system label;

in response to receiving the second access message, comparing the second system label with the plurality of authorised entity labels stored at the first system and identifying a match between the second system label and at least one of the plurality of authorised entity labels stored at the first system and, in response, transmitting a grant message indicative that the request for access is granted.

29. A computer program comprising instructions which, when the program is executed by a computer, cause the computer to carry out the method of embodiment 28.

30. A data carrier signal carrying the computer program of embodiment 29.

31. A computer readable medium which, when the program is executed by a computer, cause the computer to carry out the method of embodiment 28.

32. A data management system for sharing data associated with a first user, the data management system comprising:

a data storage resource configured to:

store user data associated with the first user;

store an authorised entity database comprising a plurality of authorised entity labels each indicative of an identifier of an authorised entity;

wherein the data management system further comprises processing circuitry configured to:

receive a first access message, from a remote system, associated with a request for access to the user data, the first access message comprising a remote system label indicative of an identifier of the remote system;

compare the remote system label with the plurality of authorised entity labels, in response to receiving the first access message, and identify a match between the second system label and at least one of the plurality of authorised entity labels and, in response, transmit a grant message indicative that the request for access is granted;

receive a second access message, from the remote system, associated with the request for access to the user data, the second access message comprising the remote system label;

compare the remote system label with the plurality of authorised entity labels, in response to receiving the second access message; and identify a match between the remote system label and at least one of the plurality of authorised entity labels and, in response, transmit a grant message indicative that the request for access is granted.

33. A data management system for sharing data associated with a first user, the data management system comprising:

a data storage resource configured to store user data associated with the first user; and store an authorised entity database comprising a plurality of authorised entity labels each indicative of an identifier of an authorised entity; and a receiver arranged to receive a first access message, from a remote system, associated with a request for access to the user data, the first access message comprising a remote system label indicative of an identifier of the remote system;

a comparison module arranged to compare the remote system label with the plurality of authorised entity labels, in response to receiving the first access message, and cause an identification module to identify a match between the remote system label and at least one of the plurality of authorised entity labels and, in response, cause a transmitter to transmit a grant message indicative that the request for access is granted;

wherein the receiver is arranged to receive a second access message, from the remote system, associated with the request for access to the user data, the second access message comprising the remote system label;

wherein the comparison module is arranged to compare the remote system label with the plurality of authorised entity labels, in response to receiving the second access message; and cause the identification module to identify a match between the remote system label and at least one of the plurality of authorised entity labels and, in response, cause the transmitter to transmit a grant message indicative that the request for access is granted.

The invention claimed is:

1. A computer-implemented method for sharing data associated with a first user, the method comprising:

storing, at a first system, user data associated with the first user;

storing, at the first system, a first authorised entity database comprising a plurality of authorised entity labels each indicative of an identifier of an authorised entity, wherein storing the first authorised entity database comprises:

transmitting, from the first system to an authorisation system, a plurality of requests to access a second authorised entity database stored at the authorisation system; and receiving and storing, at the first system, at least a portion of the second authorised entity database in response to each one of the plurality of requests to access the second authorised entity database;

wherein the plurality of requests to access the second authorised entity database are transmitted in a predefined time sequence, wherein the predefined time sequence comprises a predefined time interval between each adjacent one of the requests to access the second authorised entity database, and wherein the predefined time sequence is configurable, by the first system, based on system conditions;

storing, at the first system, an unauthorised entity database comprising a plurality of unauthorised entity labels each indicative of an identifier of an unauthorised entity;

receiving a first access message, from a second system, associated with a request for access to the user data stored at the first system, the first access message comprising a second system label indicative of an identifier of the second system;

in response to receiving the first access message, comparing the second system label with the plurality of authorised entity labels and the plurality of unauthorised entity labels stored at the first system;

in response to identifying that the second system label matches an authorised entity label and that the second system label does not match an unauthorised entity label, transmitting a grant message indicative that the request for access is granted; and preventing transmission of the grant message, if the second system label in the first access message matches an unauthorised entity label and/or does not match an authorised entity label.

2. The computer-implemented method of claim 1 wherein storing the first authorised entity database at the first system comprises:

transmitting, from the first system to an authorisation system, a request to access the second authorised entity database stored at the authorisation system; and receiving and storing, at the first system, at least a portion of the second authorised entity database in response to the request to access the second authorised entity database.

3. The computer-implemented method of claim 1 wherein the first access message comprises a request for an intent web token which validates a request for access to the user data stored at the first system.

4. The computer-implemented method of claim 1 wherein the first access message comprises a request for access to the user data stored at the first system.

5. The computer-implemented method of claim 1 wherein the first access message comprises a request to redirect a first user device to the first system for the first user to provide authorisation for the second system to access the user data.

6. The computer-implemented method of claim 1 further comprising:

receiving a second access message, from the second system, associated with the request for access to the user data stored at the first system, the second access message comprising the second system label; and in response to receiving the second access message, comparing the second system label with the plurality of authorised entity labels stored at the first system and identifying a match between the second system label and at least one of the plurality of authorised entity labels stored at the first system and, in response, transmitting a grant message indicative that the request for access is granted.

7. The computer-implemented method of claim 6 wherein the second access message comprises a request for an execute web token which validates a request for the first system to transmit the user data to the second system.

8. The computer-implemented method of claim 6 wherein the second access message comprises a request for the first system to transmit the user data to the second system.

9. The computer-implemented method of claim 6 further comprising:

in response to receiving the second access message, comparing the second system label with the plurality of unauthorised entity labels stored at the first system and not identifying a match between the second system label and at least one of the plurality of unauthorised entity labels stored at the first system and, in response, transmitting a grant message indicative that the request for access is granted.

10. The computer-implemented method of claim 9 further comprising:

in response to receiving the second access message, comparing the second system label with the plurality of authorised entity labels stored at the first system and not identifying a match between the second system label and at least one of the plurality of authorised entity labels stored at the first system and, in response, preventing transmission of the grant message.

11. The computer-implemented method of claim 1 further comprising:

receiving or inputting, at the first system, an unauthorised entity detection message comprising a label indicative of an identifier of an entity suspected of fraudulent activity and/or suspected of being subject to a security breach; and storing, in the unauthorised entity database at the first system, the label from the unauthorised entity detection message as an unauthorised entity label indicative of an identifier of an unauthorised entity.

12. A data management system for sharing data associated with a first user, the data management system comprising:

a data storage device configured to:

store user data associated with the first user;

store a first authorised entity database comprising a plurality of authorised entity labels each indicative of an identifier of an authorised entity, wherein storing the first authorised entity database comprises:

transmitting, from the first system to an authorisation system, a plurality of requests to access a second authorised entity database stored at the authorisation system; and receiving and storing, at the first system, at least a portion of the second authorised entity database in response to each one of the plurality of requests to access the second authorised entity database;

wherein the plurality of requests to access the second authorised entity database are transmitted in a predefined time sequence, wherein the predefined time sequence comprises a predefined time interval between each adjacent one of the requests to access the second authorised entity database, and wherein the predefined time sequence is configurable, by the first system, based on system conditions; and store an unauthorised entity database comprising a plurality of unauthorised entity labels each indicative of an identifier of an unauthorised entity;

wherein the data management system further comprises processing circuitry configured to:

receive a first access message, from a remote system, associated with a request for access to the user data stored at the first system, the first access message comprising a remote system label indicative of an identifier of the remote system;

compare the remote system label with the plurality of authorised entity labels and the plurality of unauthorised entity labels stored at the first system, in response to receiving the first access message;

transmit a grant message indicative that the request for access is granted, in response to identifying that the remote system label matches an authorised entity label and that the remote system label does not match an unauthorised entity label; and prevent transmission of the grant message, if the remote system label in the first access message matches an unauthorised entity label and/or does not match an authorised entity label.

* * * * *